(12) United States Patent
Garbow

(10) Patent No.: US 7,761,745 B2
(45) Date of Patent: Jul. 20, 2010

(54) CLUSTERING PROCESS FOR SOFTWARE SERVER FAILURE PREDICTION

(75) Inventor: Zachary A. Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/360,063

(22) Filed: Jan. 26, 2009

(65) Prior Publication Data

US 2009/0132864 A1 May 21, 2009

Related U.S. Application Data

(63) Continuation of application No. 11/262,127, filed on Oct. 28, 2005, now Pat. No. 7,484,132.

(51) Int. Cl.
*G06F 11/00* (2006.01)
(52) U.S. Cl. .......................................... 714/47; 714/26
(58) Field of Classification Search ........................ None
See application file for complete search history.

(56) References Cited

U.S. PATENT DOCUMENTS

| | | |
|---|---|---|
| 6,199,018 B1 | 3/2001 | Quist et al. |
| 6,343,236 B1 | 1/2002 | Gibson et al. |
| 6,622,264 B1 | 9/2003 | Bliley et al. |
| 6,738,933 B2 | 5/2004 | Fraenkel et al. |
| 6,947,797 B2 | 9/2005 | Dean et al. |
| 7,016,809 B1 | 3/2006 | Gotwals et al. |
| 7,027,950 B2 | 4/2006 | Zhang |
| 7,158,917 B1 | 1/2007 | Bickford |
| 7,251,754 B2 | 7/2007 | Maxwell |
| 7,484,132 B2 | 1/2009 | Garbow |
| 2007/0005297 A1 | 1/2007 | Beresniewicz et al. |

FOREIGN PATENT DOCUMENTS

GB 2390447 1/2004

OTHER PUBLICATIONS

IBM T J Watson Research Center, "The Third Proactive Problem Prediction, Avoidance and Diagnosis Conference: Predictive Techniques for Self-healing and Performance Optimization," IBM Academy of Technology, Apr. 26-27, 2005; pp. 1-9; http://www.research.ibm.comiaoftp3ad/przfiles/2005.ProgramFinal.pdf.

(Continued)

*Primary Examiner*—Marc Duncan
(74) *Attorney, Agent, or Firm*—Patterson & Sheridan, LLP

(57) ABSTRACT

Embodiments of the present invention allow the prevention and/or mitigation of damage caused by server failure by predicting future failures based on historic failures. Statistical data for server parameters may be collected for a period of time immediately preceding a historic server failure. The data may be clustered to identify cluster profiles indicating strong pre-fault clustering patterns. Real time statistics collected during normal operation of the server may be applied to the cluster profiles to determine whether real time statistics show pre-fault clustering. If such a pattern is detected, measures to prevent or mitigate server failure may be initiated.

18 Claims, 13 Drawing Sheets

OTHER PUBLICATIONS

Zachary A Garbow, "Forecasting Software Server Failures Using Clustering Algorithms," the Third Proactive Problem Prediction, Avoidance and Diagnosis Conference: Predictive Techniques for Self-Healing and Performance Optimization; Apr. 26, 2005; pp. 1-43; http:/www.researchibm.com/aoftp3ad/przfiles/S040.ppt.

Gunther A Goffmann et al. "Advanced Failure Prediction in Complex Software Systems," Research Report No. 172, Department of Computer Science, Humboldt University Berlin; Apr. 2004; pp. 1-19; http://www.rok.informatik.hu-berlin.de/Members/salfner/publications/hoffmann04advanced.pdf.

Zachary A Garbow et al., "Remote Visualization and Cluster Analysis of 3-D Geophysical Data over the Internet Using Off-Screen Rendering," Jun. 2003, pp. 1-18, http:/www.msi.ummedu/{lilli/web-is.pdf.

Dave A. Yuen et al., "Clustering and Visualization of Earthquake Data in a Grid Environment," submitted to Visual Geosciences, 2004; revised version: Feb. 2005, http://www.vlab.msi.umn.edu/reports/publicationFiles/dave-visgeo.pdf.

"Machine Learning for Failure Prediction in Computer-controlled Devices," Cigital, http://www.cigital.com/labs/projects/1037/, 2005.

Dr. Norman F. Schneidewind, "CrossTalk—The Journal of Defense Software Engineering: A Recommended Practice for Software Reliability," http://www.stsc.hill.af.mil/crosstalk/2004/08/0408Schneidewind.html, Aug. 2004.

K. Kanoun et al., "IEEE Transactions on Software Engineering: A Method for Software Reliability Analysis and Prediction Application to the TROPICO-R Switching System," Apr. 1991, vol. 17, No. 4, pp. 334-344, http://csd12.computer.org/persagen/DLAbsToc.jsp?resourcePath=/dl/trans/ts/&toc=comp/tran.

Doug Turnbull et al., "Failure Prediction in Hardware Systems," http://louis.ucsd.edu/~nalldrin/research/f03/cse221/cse221.pdf.

S.M.A.R.T—Self-Monitoring, Analysis, and Reporting Technology, http://www.dataclinic.co.uk/data-recovery/learn-more-about-SMART.htm, 2005.

"Understanding SMART Technology," http://www.drivehealth.com/smart.html, 2005.

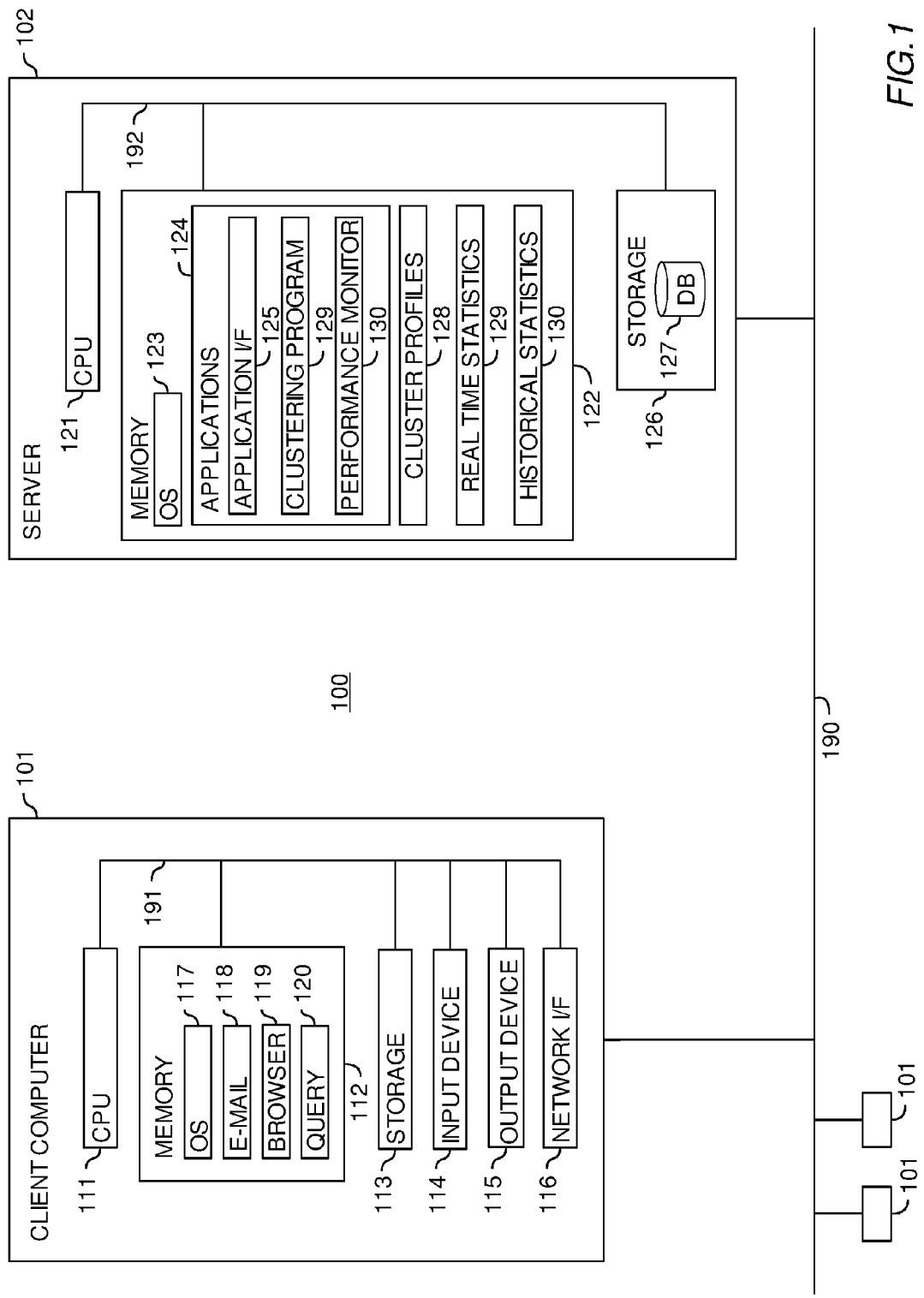

| DATA POINT 1 | DATA POINT 2 | DISTANCE |
|---|---|---|
| A | B | 1 |
| A | C | 1 |
| A | D | 3.16 |
| A | E | 5 |
| A | F | 4.12 |
| B | C | 1.41 |
| B | D | 3 |
| B | E | 4.47 |
| B | F | 4 |
| C | D | 2.24 |
| C | E | 4.24 |
| C | F | 3.16 |
| D | E | 2.23 |
| D | F | 1 |
| E | F | 2 |

*FIG. 4*

| DATA POINT | PRIORITY | |
|---|---|---|
| | 0 | 1 |
| A | B | C |
| B | A | C |
| C | A | B |
| D | F | E |
| E | F | D |
| F | E | D |

| POINT PAIR | MNN SCORE |
|---|---|
| (A,B) | 0 |
| (A,C) | 1 |
| (B,C) | 2 |
| (D,E) | 1 |
| (D,F) | 1 |
| (E,F) | 0 |

601

| POINT PAIR | MNN SCORE |
|---|---|
| (A,B) | 0 |
| (E,F) | 0 |
| (A,C) | 1 |
| (D,E) | 1 |
| (D,F) | 1 |
| (B,C) | 2 |

*FIG. 6*

CLUSTERING PROCESS FOR SOFTWARE SERVER FAILURE PREDICTION

CROSS-REFERENCE TO RELATED APPLICATIONS

This application is a continuation of U.S. patent application Ser. No. 11/262,127, filed Oct. 28, 2005, now U.S. Pat. No. 7,484,132 which is herein incorporated by reference in its entirety.

BACKGROUND OF THE INVENTION

1. Field of the Invention

The present invention generally relates to server maintenance and more specifically to predicting server failure based on historic server failures.

2. Description of the Related Art

Servers have become the heart and soul of modern computing infrastructures. Most businesses maintain servers to perform business functions, as well as to provide core Information Technology (IT) services. For example, an e-commerce business may maintain a server containing the business website. The e-commerce server may perform business functions including displaying products, handling online orders and inventory management. The server may also perform critical IT functions including email, file storage, print and database services. Because such businesses are highly dependent on the proper functioning of such a server, the reliability of the server becomes critical to ensure the smooth running of the business.

However, servers are inherently prone to failure, which may be caused by both hardware and software. The loss of service and fault correction costs associated with such failure may prove to be very expensive for users of high end servers where customer demand is high and incessant. Therefore, it is necessary to identify and understand server failures, and correct them before they occur.

Server failures fall into two categories: predictable failures and unpredictable failures. Predictable failures are characterized by the degradation of an attribute over time, resulting in eventual server failure. It may be possible to make a reasonably accurate prediction of threshold values at which server failure may occur. Therefore, it may be possible to avoid server failure by monitoring attribute values and taking corrective measures as the values approach a predetermined threshold.

Mechanical failures, which account for sixty percent of hard disk failures, are typically considered predictable. Monitoring the physical attributes of components may therefore facilitate failure prediction and prevention. For example, it is possible to monitor, in real time, attributes of a hard disk such as disk spin time, temperature, distance from head to disk, etc. If values for these attributes approach threshold values, a user may be prompted with a warning to take corrective measures such as backing up data and replacing the disk.

However, because software does not fatigue, wear out, or burn out, software failures may be more difficult to predict. Software problems, unlike hardware problems, tend to be event or input driven rather than time driven. Furthermore, software problems may be much more complex than hardware problems. Some common causes of software problems include software design flaws, unexpected or mishandled events, corrupt data etc.

While current forecasting approaches can predict the number of faults expected for a software server, these approaches are not able to predict when such faults are likely to appear. Therefore, they provide no solutions for preventing software failures. Moreover, predicting software failures may require developing a set of constraints for a particular software configuration. This may require the constraints to be found within the complicated code of the software. However, the high rate of software changes (software updates, for example), may require this tedious analysis to be performed at each change, which may be impractical.

Therefore, what is needed is a method and system for predicting software server failures before they happen.

SUMMARY OF THE INVENTION

Embodiments of the present invention provide methods, computer readable storage media and systems for the prevention and/or mitigation of damage caused by server failure by predicting future failures based on historical failures.

One embodiment of the invention provides a method for predicting failure of a server. The method generally comprises collecting real time server statistics of the server, applying the real time server statistics to at least one cluster profile, wherein the cluster profile comprises one or more server parameters, one or more clustering parameters, and a weight associated with each server parameter, wherein the server parameters and the weight associated with each server parameter are selected on the basis of historical pre-fault clustering of the server parameters, and determining a probability of failure of the server based on a relationship between the real time server statistics and the one or more cluster profiles.

Another embodiment of the invention provides a computer readable storage medium containing a program which, when executed performs operations for predicting failure. The operations generally comprise collecting real time server statistics of the server, applying the real time server statistics to at least one cluster profile, wherein the cluster profile comprises one or more server parameters, one or more clustering parameters, and a weight associated with each server parameter, wherein the server parameters and the weight associated with each server parameter are selected on the basis of historical pre-fault clustering of the server parameters, and determining a probability of failure of the server based on a relationship between the real time server statistics and the one or more cluster profiles.

Yet another embodiment of the invention provides a server generally comprising a memory and a processor communicably connected to the memory. The memory comprises a monitoring application and at least one cluster profile wherein the cluster profile comprises one or more server parameters, one or more clustering parameters and a weight associated with each server parameter, wherein the server parameters and the weights associated with each server parameter are selected on the basis of historical pre-fault clustering of the server parameters. The processor when executing the monitoring application is configured to collect real time server statistics of the server, apply the real time server statistics to the at least one cluster profile, and determine a probability of failure of the server based on a relationship between the real time server statistics and the one or more cluster profiles.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a computer system illustratively utilized in accordance with this invention.

FIG. 4 is a table listing the distances between each pair of points in FIG. 3.

FIG. 5 is a table listing the two nearest neighbors and the priority rank for the nearest neighbors for each point in FIG. 3.

FIG. 6 is a table listing the Mutual Nearest Neighbor (MNN) score for nearest neighbor pairs of points from FIG. 3.

DETAILED DESCRIPTION OF THE PREFERRED EMBODIMENTS

Figure 2B:
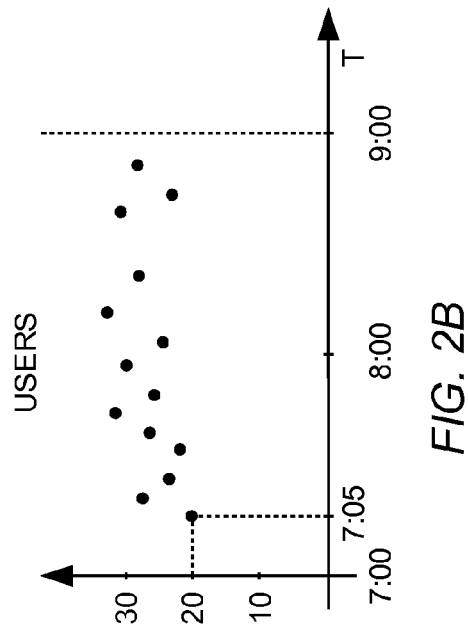
FIGS. 2A-2D are graphs of server parameters preceding a server failure.

Embodiments of the present invention allow the prevention and/or mitigation of damage caused by server failure by predicting future failures based on historical failures. Statistical data for server parameters may be collected for a period of time immediately preceding a historical server failure. The data may be clustered to identify cluster profiles indicating strong pre-fault clustering patterns. Real time statistics collected during normal operation of the server may be applied to the cluster profiles to determine whether real time statistics show pre-fault clustering. If such a pattern is detected, measures to prevent or mitigate server failure may be initiated.

In the following, reference is made to embodiments of the invention. However, it should be understood that the invention is not limited to the specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, computer system 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 depicts a block diagram of a networked system 100 in which embodiments of the present invention may be implemented. In general, the networked system 100 includes a client (e.g., user's) computer 101 (three such client computers 101 are shown) and at least one server 102 (one such server 102 shown). The client computers 101 and server 102 are connected via a network 190. In general, the network 190 may be a local area network (LAN) and/or a wide area network (WAN). In a particular embodiment, the network 140 is the Internet.

The client computer 101 includes a Central Processing Unit (CPU) 111 connected via a bus 191 to a memory 112, storage 113, an input device 114, an output device 115, and a network interface device 116. The input device 114 can be any device to give input to the client computer 101. For example, a keyboard, keypad, light-pen, touch-screen, track-ball, or speech recognition unit, audio/video player, and the like could be used. The output device 115 can be any device to give output to the user, e.g., any conventional display screen. Although shown separately from the input device 114, the output device 115 and input device 114 could be combined. For example, a display screen with an integrated touch-screen, a display with an integrated keyboard, or a speech recognition unit combined with a text speech converter could be used.

The network interface device 116 may be any entry/exit device configured to allow network communications between the client computers 101 and server 102 via the network 190. For example, the network interface device 116 may be a network adapter or other network interface card (NIC).

Storage 113 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 113 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 117. Illustrative operating systems, which may be used to advantage, include Linux and Microsoft's Windows®. More generally, any operating system supporting the functions disclosed herein may be used.

The memory 112 is also shown containing an email program 118, browser program 119, and query program 120 that, when executed by CPU 111, provides support for communicating with server 102. Email program 118 may be configured to retrieve electronic mail messages stored in server 102. Browser program 119 may be configured to retrieve information available on the World Wide Web by issuing requests to web servers. Examples of browser programs include Microsoft Internet Explorer and Netscape Navigator. Query program 120 may be configured to issue queries to servers in the user's Local Area Network. Browser Program 119 and Query program 120 may include a web-based Graphical User Interface (GUI), which allows the user to display Hyper Text Markup Language (HTML) information. More generally, however, the browser program and query program may be a GUI-based program capable of rendering the information transferred between the client computer 101 and the server 102.

The server 102 may be physically arranged in a manner similar to the client computer 101. Accordingly, the server 102 is shown generally comprising a CPU 121, a memory 122, and a storage device 126, coupled to one another by a bus 192. Memory 122 may be a random access memory sufficiently large to hold the necessary programming and data structures that are located on the server 102.

The server 102 is generally under the control of an operating system 123 shown residing in memory 122. Examples of the operating system 123 include IBM OS/400®, UNIX, Microsoft Windows®, and the like. More generally, any operating system capable of supporting the functions described herein may be used.

The memory 122 further includes one or more applications 124, cluster profiles 128, real time statistics data structure 129, and historical statistics data structure 130. The applications 124 are software products comprising a plurality of instructions that are resident at various times in various memory and storage devices in the computer system 100. For example, applications 124 may contain an application interface 125, clustering program 129, and performance monitor 130. The application interface 125 (and more generally, any requesting entity, including the operating system 123) is configured to issue queries against a database 127 (shown in storage 126). The database 127 is representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

Clustering program 129, when executed by CPU 121, may be configured to perform operations according to embodiments of the invention. More specifically, clustering program 129 may be configured to retrieve historical server statistics contained in the historical statistics data structure 130 that precede server failures and apply a clustering algorithm to the historical statistics to create cluster profiles 128. Illustrative historical server statistics include CPU usage, number of users, bandwidth used, transactions per second, disk drive accesses, etc.

Performance monitor 130, when executed by the CPU may be configured to monitor performance of server 102 by collecting real time server statistics and storing them in the real time statistics data structure 129. Real time server statistics may include parameters such as CPU usage, number of users, bandwidth used, transactions per second, disk drive accesses, etc. Thus, the metrics defining real time server statistics may be the same as those defining the historical server statistics. The real time statistics may be compared to cluster profiles 128 to determine a probability of server failure. If the probability of server failure indicates an impending failure, performance monitor 130 may initiate preventive measures to avoid the failure.

In one embodiment of the invention, server 102 may be an email server. Application interface 125 may be configured to receive email requests from a client 101, retrieve electronic mail messages stored in database 126 and send the messages to the client 101 over network 190. In other embodiments, server 102 may operate similarly as a web server or an applications server.

Embodiments of the present invention may generally include any combination of steps including, for example, server calibration, real time forecasting, and failure prevention. The server calibration process may involve analyzing historical data to identify patterns representative of an impending failure. Real time forecasting involves monitoring real time server statistics and comparing the statistics to historical data to predict an impending failure. If an impending failure is expected, preventive measures may be undertaken to avoid the failure. A more detailed description of the above-mentioned steps follows.

Server Calibration

Most server failures tend to develop over time, rather than occur suddenly. Therefore, analyzing server behavior prior to the occurrence of the failure may provide clues as to the causes of the failure. Thus, the server calibration process may begin by collecting previously recorded historical data for a period of time immediately preceding a server failure. For example, in one embodiment of the invention, previously recorded data for a period of two hours preceding each historical server failure is collected. One skilled in the art will recognize, however, that any reasonable period of time preceding a server failure may be used.

Several events may affect the stability of a server environment. These events may include large loads, access to corrupt databases, semaphore errors and race conditions, router problems, runaway programs and processes, memory leaks, design flaws, etc., among others. The occurrence of these events may negatively affect server performance and prevent access to critical data.

The performance metrics of a server may indicate that one of the above-mentioned failure causing events is happening or about to happen. Typical server statistics that indicate the stability of the server environment include CPU utilization, response time, total number of users, memory utilization, transaction rate, network bandwidth, disk utilization, pending mail, etc. As an example, a rise in CPU utilization may indicate a runaway process or program. Similarly, an increase in the number of users and the network bandwidth used may indicate a large load.

Figure 2D:
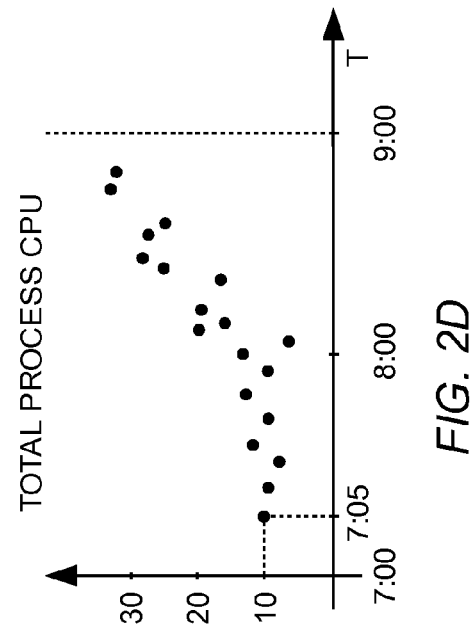
Figure 2A:
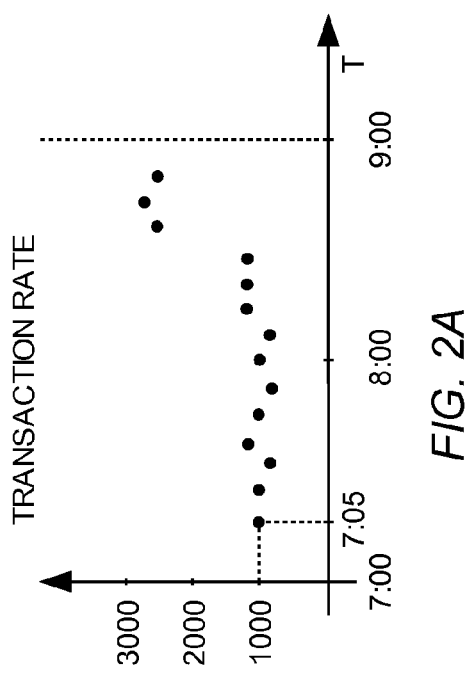
Figure 2C:
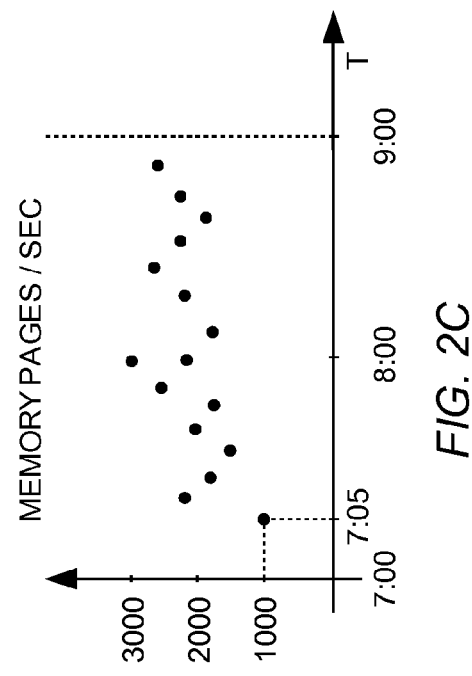

FIGS. 2A-2D are graphs of exemplary statistics collected for a period of two hours before a server crash. The x-axis for each graph is a time axis and the y-axis indicates the value of a server performance parameter. By way of example, four statistics are shown; although in practice any number of statistics may be collected. FIG. 2A illustrates the transaction rate, FIG. 2B illustrates the number of users that were accessing the server, FIG. 2C illustrates the number of memory pages that were accessed per second, and FIG. 2D illustrates the CPU utilization.

As illustrated in FIGS. 2A-2D a server failure occurred at 9:00 am (represented by the vertical dashed line). Therefore, server statistics for the period of time from 7:00 am-9:00 am are collected and shown in the graphs. While FIGS. 2B and 2C illustrate respective parameter values being relatively stable over the two hour period, FIGS. 2A and 2D illustrate a stable, steady state period followed by sharp changes in values preceding the failure. While variations in individual server parameter values may be useful in predicting server failure, an analysis of a combination of different server statistics may be more valuable because server failures may be caused by any combination of many different factors. For example, a runaway process caused by faulty program code may cause the CPU utilization to rise. However, other statistics may also be affected. For example, the response time of the server may become slower and the number of open sessions may become fewer because of the inability of users to connect to the server because of the runaway process.

Certain statistics may be more important depending on the given environment in which the server operates. For example, in a mail server the rate at which mail is sent or received may be monitored. As an example, in a mail server, a statistic tracking the amount of dead mail, wherein the dead mail value indicates the number of emails that cannot be delivered, may be a significant statistic.

One aspect of the present invention is a multidimensional analysis of server statistics. A set of multi dimensional data points may be identified using any combination of the historical parameter values. For example, {Transaction Rate, Users, Memory Pages Per Second, Total Process CPU, Time} may be a data point including all the server statistics shown in FIGS. 2A-2D. The data point identified at 7:05 a.m., for example, is {1000, 20, 1000, 10, 7:05}, because 1000 transactions per second, 20 users, 1000 memory pages per second, and 10 CPU processes are identified at 7:05 a.m., as illustrated in FIGS. 2A-2D. Similarly, data points may be identified for other times within the two hour period and included in the set of data points. While the above description illustrates four parameters being used to construct data points, one skilled in the art will recognize that any number and any combination of parameters may be used to construct the set of data points. A given data point may be generalized as {D1 . . . Di}, where D is a given server parameter and i is an integer greater than one.

In one embodiment, a clustering algorithm may be used to identify distinguishable clusters of data points within the set of data points. The criteria for clustering, for example, may depend on the Euclidean distance between the data points. Therefore, the Euclidean distance between each pair of points may be calculated. In one embodiment of the invention, a statistical weight may be applied to each parameter while calculating the distance between data points. The weight, for example, may determine the importance of the parameter in creating clusters by affecting the distance between data points. The following formula may be used to compute the Euclidean distance between point $x_i$ and $x_j$:

$$d(x_i, x_j) = \sqrt{\sum_{z=1}^{m} w_z(x_{i_z} - x_{j_z})^2}$$

wherein m parameters are used to construct data points $x_i$ and $x_j$, and weights $w_1$-$w_m$ are applied to parameters 1-m respectively. For example if point $x_i$ is (1000, 50, 20, 100), and point $x_j$ is {900, 30, 10, 90}, the Euclidean distance between the points for a weight of 1 for all parameters will be:

$$\sqrt{(1000-900)^2 + (50-30)^2 + (20-10)^2 + (100-90)^2} = 102.96$$

Figure 3:
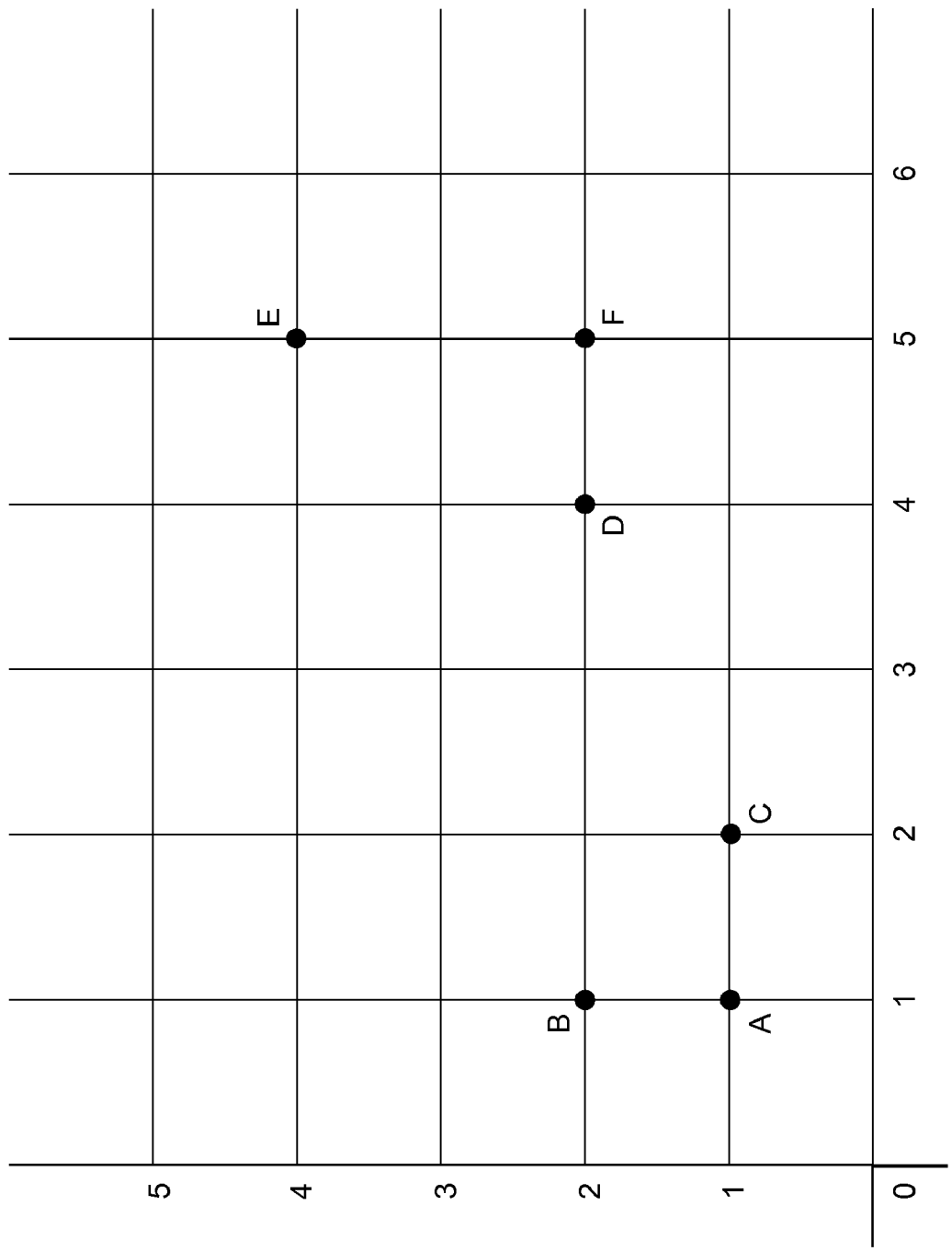
FIG. 3 is an exemplary two dimensional graph of data points on which a clustering algorithm may be performed.

The clusters may be identified based on the distance between each pair of data points calculated using the above formula. The data points closest in distance may be clustered together. FIGS. 3-6 and 7A-7D illustrate an exemplary Agglomerative Mutual Nearest Neighbor clustering algorithm that may be used in accordance with an embodiment of the invention. For simplicity, a two-dimensional data point is illustrated. FIG. 3 illustrates the data points A-F. Initially, each data point may be considered a separate cluster. The data points may then be merged by the clustering algorithm to form larger clusters with multiple data points. To facilitate the merger of data points, the distances between each pair of data points may be computed, for example, by using the above-mentioned distance formula. FIG. 4 is a table of the distances between each of the data points illustrated in FIG. 3. The distances computed in FIG. 4 may be used to determine the data points eligible for clustering with respect to a reference point.

An r-cut value may be specified to indicate a threshold radius. Data points falling outside of the threshold radius, r-cut, may not be considered a near neighbor with respect to a reference data point. For example, if an r-cut value of 4 is specified, then only points B, C and D may be considered near neighbors of point A because they are at or within a distance of 4 from A. However, points E and F are not near neighbors of point A because they are at a distance greater than 4 from A (see table in FIG. 4)

Moreover, an n-cut value may specify a maximum number of nearest neighbors from the set of near neighbors for each point. The n-cut value determines the resolution of clustering. A low n-cut value may allow for more data points to be isolated from larger clusters. For example, at an n-cut value of 2, points B and C will be the 2 nearest neighbors of point A. If the n-cut value is increased to 4, then point D will also be considered a nearest neighbor for point A along with points B and C. Similarly, the nearest neighbors for each point may be determined based on the n-cut value. FIG. 5 illustrates the top 2 (n-cut value=2) nearest neighbors for each of points A-F.

Each nearest neighbor may also be given a proximity ranking based on the distance from a particular point. The nearer the neighbor to the point the lower the proximity ranking may be. For example, the nearest neighbors for point C are points A and B. Point A may be given a priority ranking of 0 and point B a priority ranking of 1 because point A is closer to point C than point B (see FIG. 4). Similarly, priority rankings for the two nearest neighbors for each of points A-F may be assigned based on the proximity of the neighboring point. FIG. 5 shows the priority rankings for the 2 nearest neighbors for each of points A-F.

A mutual nearest neighbor (MNN) score for each pair of points may be calculated for each pair of points based on the sum of the proximity rankings of the points with respect to each other. For example, in FIG. 5, the proximity ranking for point C with respect to point A is 1, whereas the proximity ranking for point A with respect to point C is 0. Therefore, the MNN score for the point pair (A, C) is 1, the sum of their proximity rankings with respect to each other. Similarly, the proximity rankings for each point pair may be determined. FIG. 6 illustrates tables with the MNN score for each point pair comprising points A-F. Table 601, in FIG. 6, shows the pairs of data points in table 602 sorted by their MNN score.

Figure 7A:
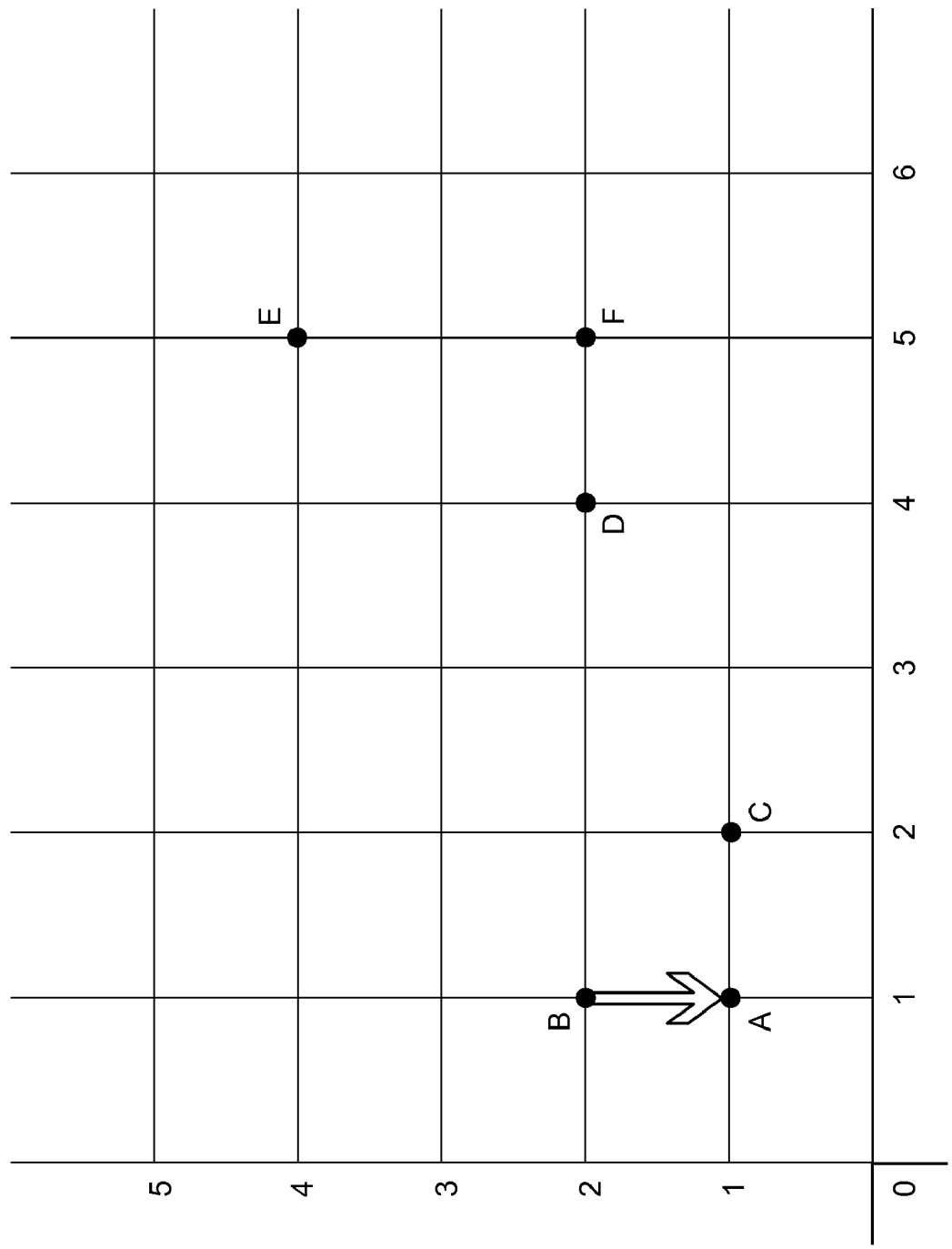
FIGS. 7A-7F illustrate the agglomerative mutual nearest clustering of the points in FIG. 3 based on the MNN scores.
Figure 7B:
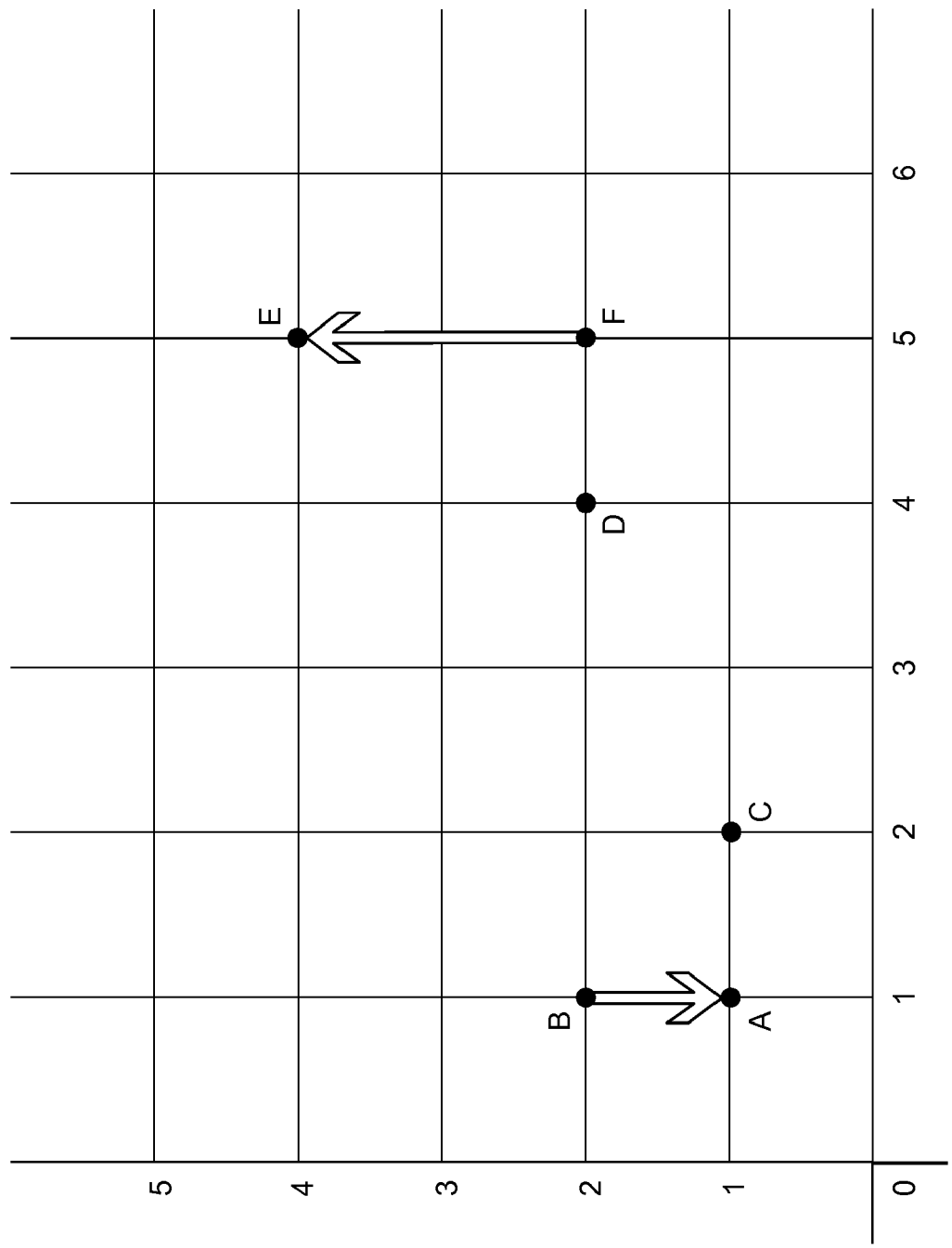
Figure 7C:
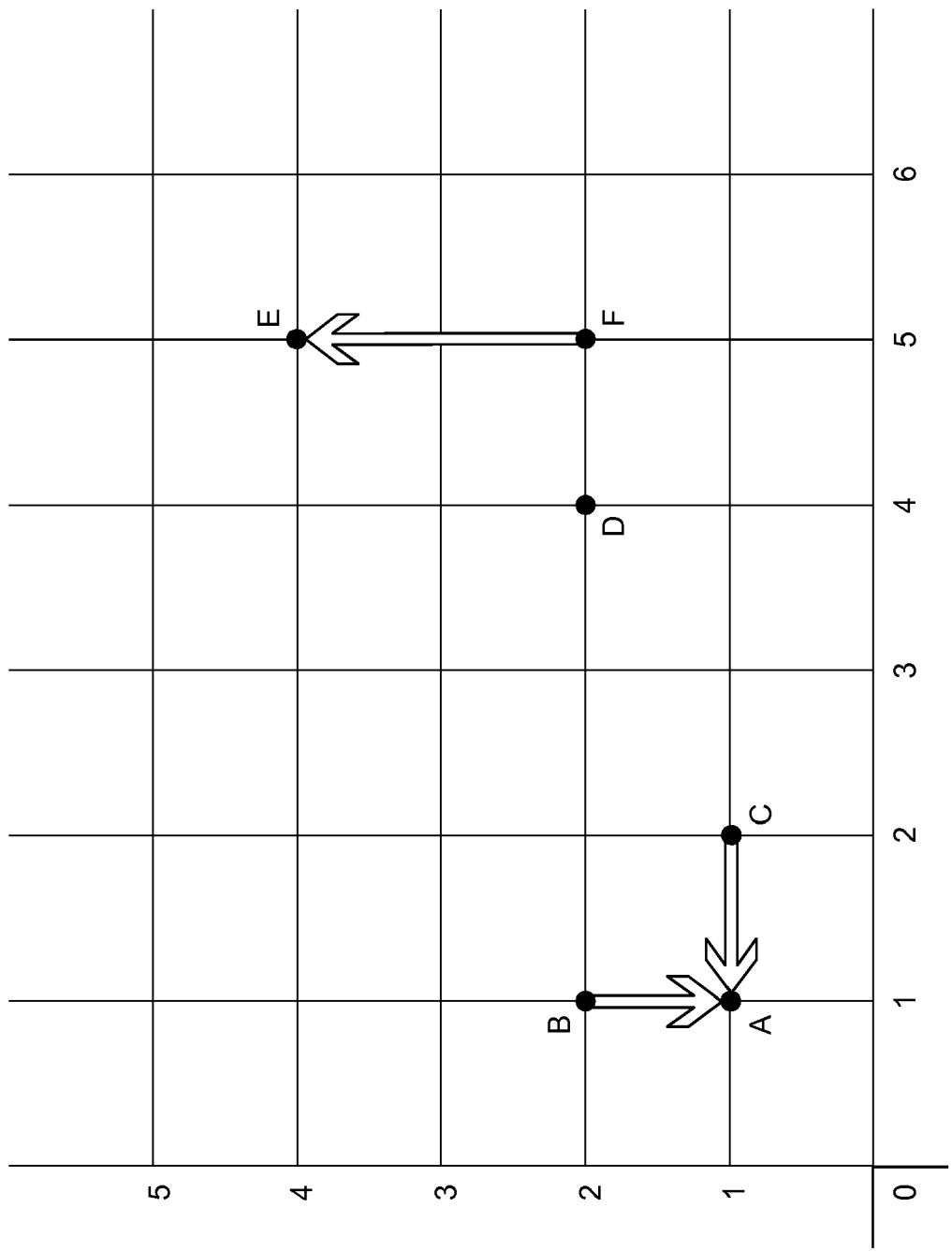
Figure 7D:
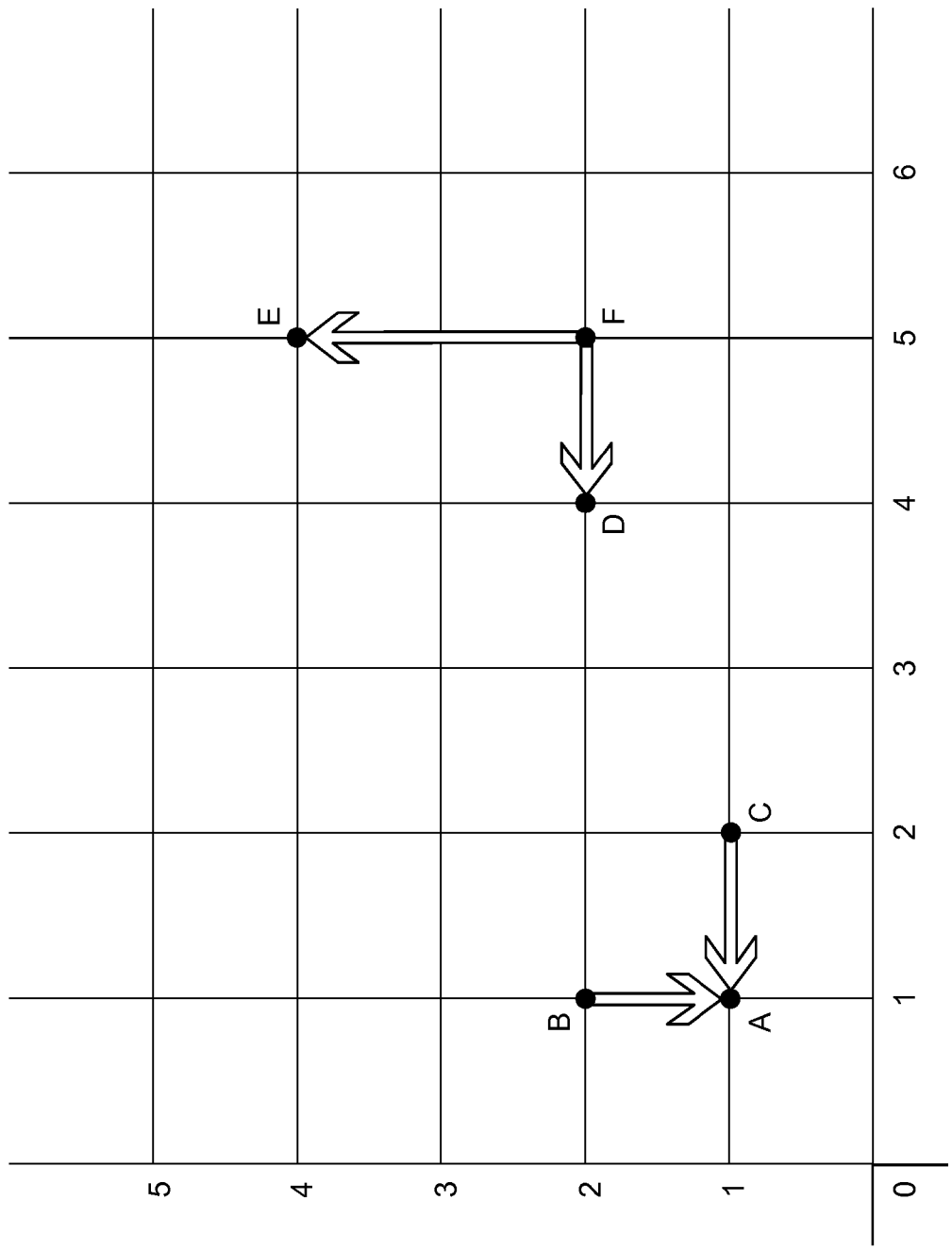
Figure 7E:
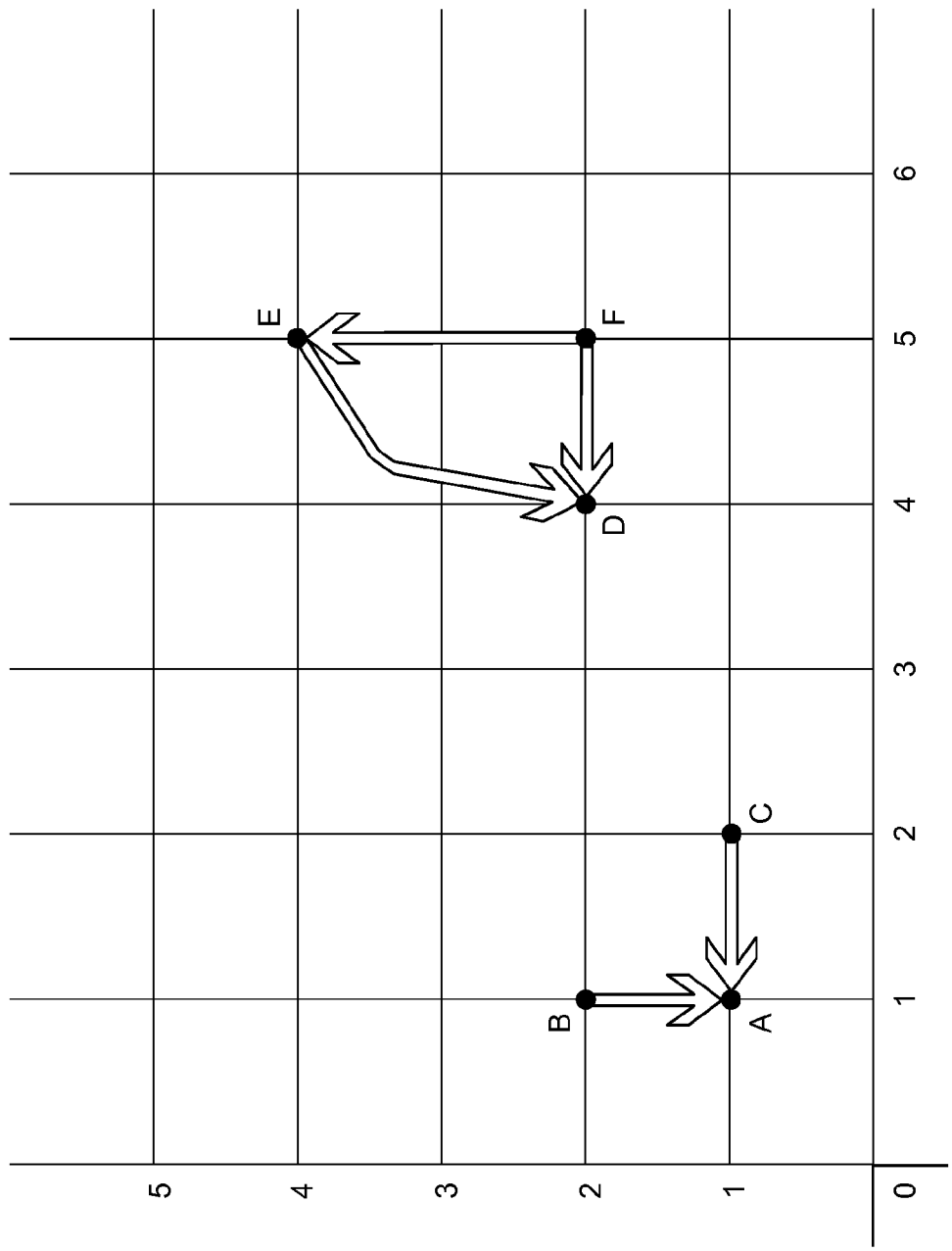
Figure 7F:
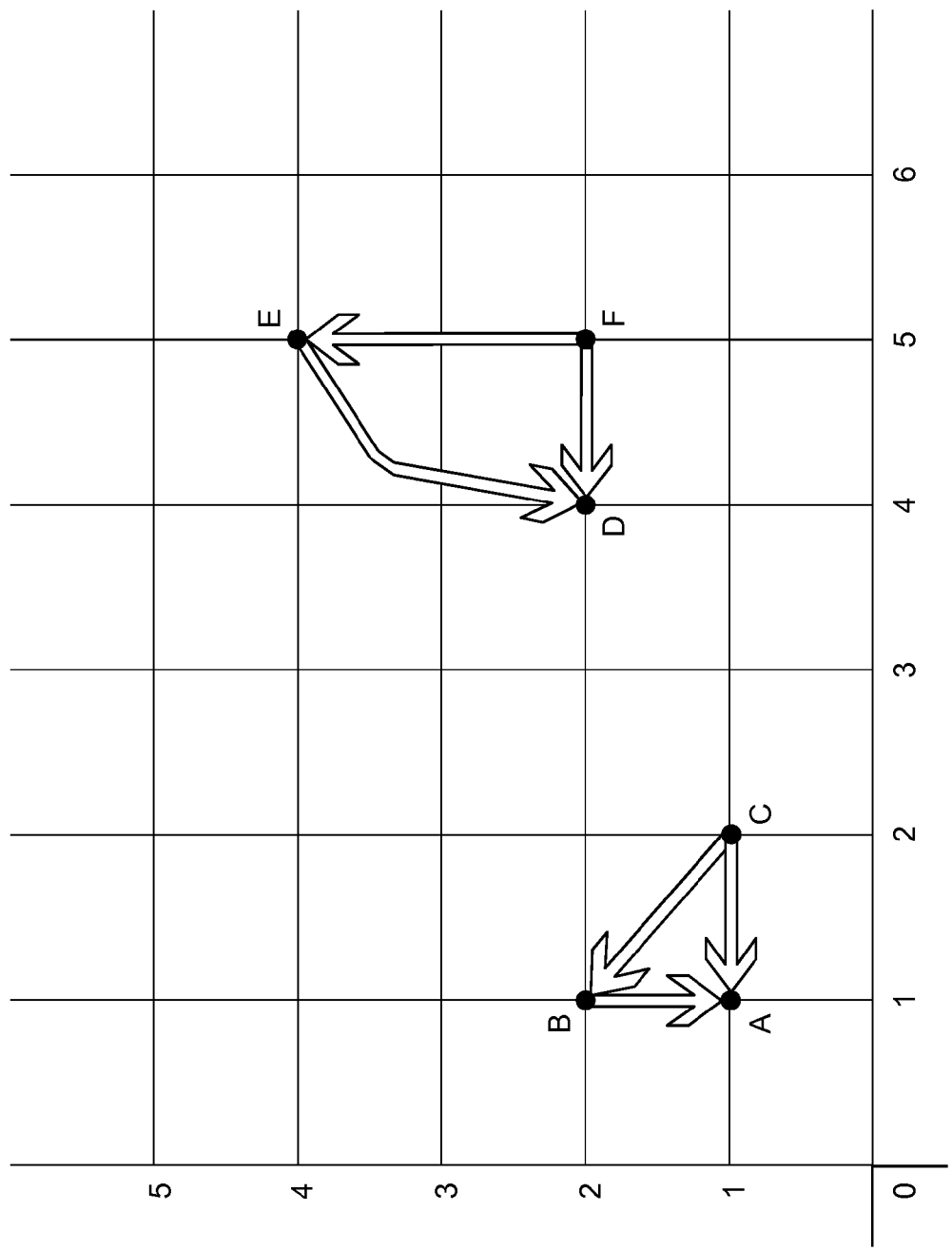

In one embodiment, the MNN score may be used to cluster pairs of data points. In one aspect, using the MNN score clusters are created based on the mutual strength of the bond between a pair of points. A threshold MNN score value may be specified so that only those points with the strongest mutual bond are clustered. In FIG. 6, the lower the MNN score, the stronger the bond between a pair of points. Therefore, the pairs of points with the lowest MNN score within the threshold may be clustered first. For example, with an MNN threshold value of 2, all pairs of points in FIG. 6 will be clustered together, with the points with an MNN score of 1 being clustered first. However, if a threshold value of 1 was used, then points B and C will not be clustered because the MNN score for the point pair including points B and C is 2. FIGS. 7A-7F illustrate a series of clustering steps to cluster pairs of points in table 601 for an MNN threshold value of 2. Two clusters are formed as a result, and are illustrated in FIG. 7F. The first cluster consists of points A, B, and C; and the second cluster consists of points D, E and F.

While the above description illustrates an agglomerative mutual nearest neighbor clustering algorithm being used to cluster data points, one skilled in the art will recognize that any appropriate clustering algorithm may be used. For example, the k-means clustering or the hierarchical clustering algorithms may be used instead of the agglomerative clustering described above.

The clustering algorithm may be performed on various settings, wherein each setting includes a combination of parameters and parameter weight values, to determine the strongest cases for pre-fault clustering. The strongest cases for pre-fault clustering may be determined by identifying those settings that show a period of steady state, wherein the all data points merge into a single cluster, followed by an increasingly unsteady state immediately preceding a server failure, wherein the data points form new clusters.

Another method for determining strong pre-fault clustering patterns may include identifying those settings that show a period of data points which join historical clusters of data points that have previously been classified as "normal" clusters, followed by data points that join historical clusters that have been defined as "high risk" or "unsteady" clusters. Therefore, the strength of the pre-fault clustering pattern may depend on the classification of data points into previously identified clusters rather than the rate of change of clusters. In some embodiments, the strength of the pre-fault clustering pattern may depend on a combination of the classification of data points into previously identified clusters and the rate of change of clusters.

Figure 8:
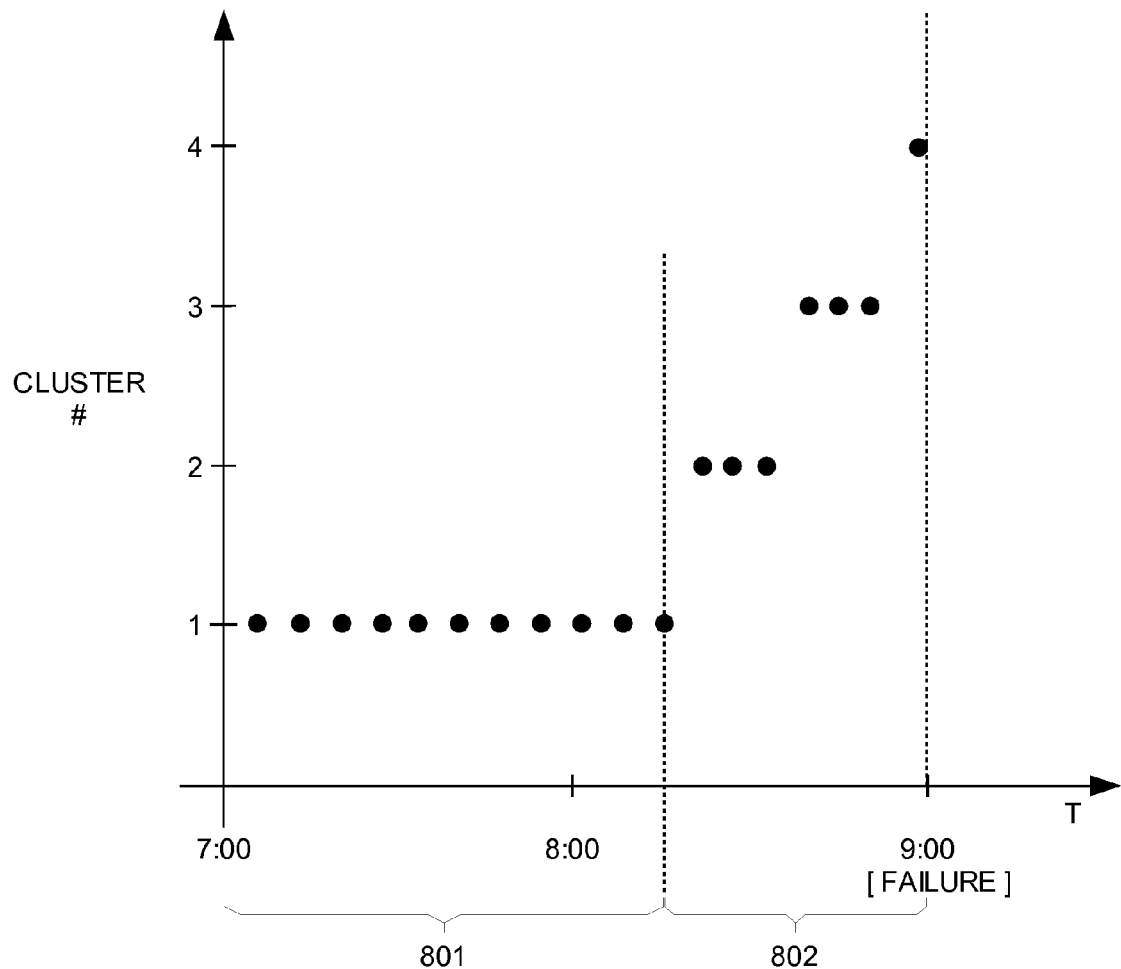
FIG. 8 illustrates an exemplary pre-fault clustering pattern.

FIG. 8 illustrates a graph showing a strong pre-fault clustering pattern. The x-axis of the graph is a time axis, and the y-axis identifies a cluster to which the data points belong. Period 801 illustrates a steady state period wherein the data points merge into cluster 1. Period 802, on the other hand, illustrates an unsteady state preceding a server failure. Period 802 is characterized by rapidly changing clusters. The strength of the setting may be determined by an algorithm or by Fourier analysis. The strength, for example, may depend on the resemblance of a given clustering pattern to a pre-defined pre-fault clustering pattern. The algorithm or Fourier analysis may determine the strength of the setting based on a comparison of a given clustering pattern to the pre-defined pre-fault clustering pattern. For example, the more closely aligned a given clustering pattern is with the pre-fault clustering pattern the greater the relative strength of the setting.

In one embodiment, the settings associated with the strongest cases for pre-fault clustering may be saved as a profile. The profiles may be identified based on the parameters considered and/or the magnitude of the parameter weights. For example, if memory usage is emphasized by the selection of parameters and parameter weights, then the profile may be saved as a "Possible Memory Issue."

The above mentioned clustering algorithm and calibration process may be performed for each historic server failure, using any combination of parameter and parameter weights for each server failure. Several profiles may be identified and saved for future reference to determine a probability of server failure Real-Time Forecasting Software, such as the performance monitor 130 in FIG. 1, may collect real time server statistics and calculate a probability of failure by comparing real time clustering to historical clustering. The real time server statistics may be applied to all the saved profiles to determine real time cluster strengths for each profile. As with the historical statistics, an algorithm or Fourier analysis may be used to determine whether the real time statistics form a pre-fault clustering pattern based on the steadiness of state and the rate of change of real time clusters for each profile. The probability of failure may be determined based on the probability of failure indicated by each profile, which in turn is based on the strength and persistence of real time clusters for the profile.

Based on the probability of failure and the specific profile contributing to an increased probability of failure, mitigation measures may be initiated by performance monitor 130. For example, if real time statistics, when applied to the "Possible Memory Issue" profile show a strong pre-fault clustering pattern, the user may be prompted to back-up critical data before the server crash.

Figure 9:
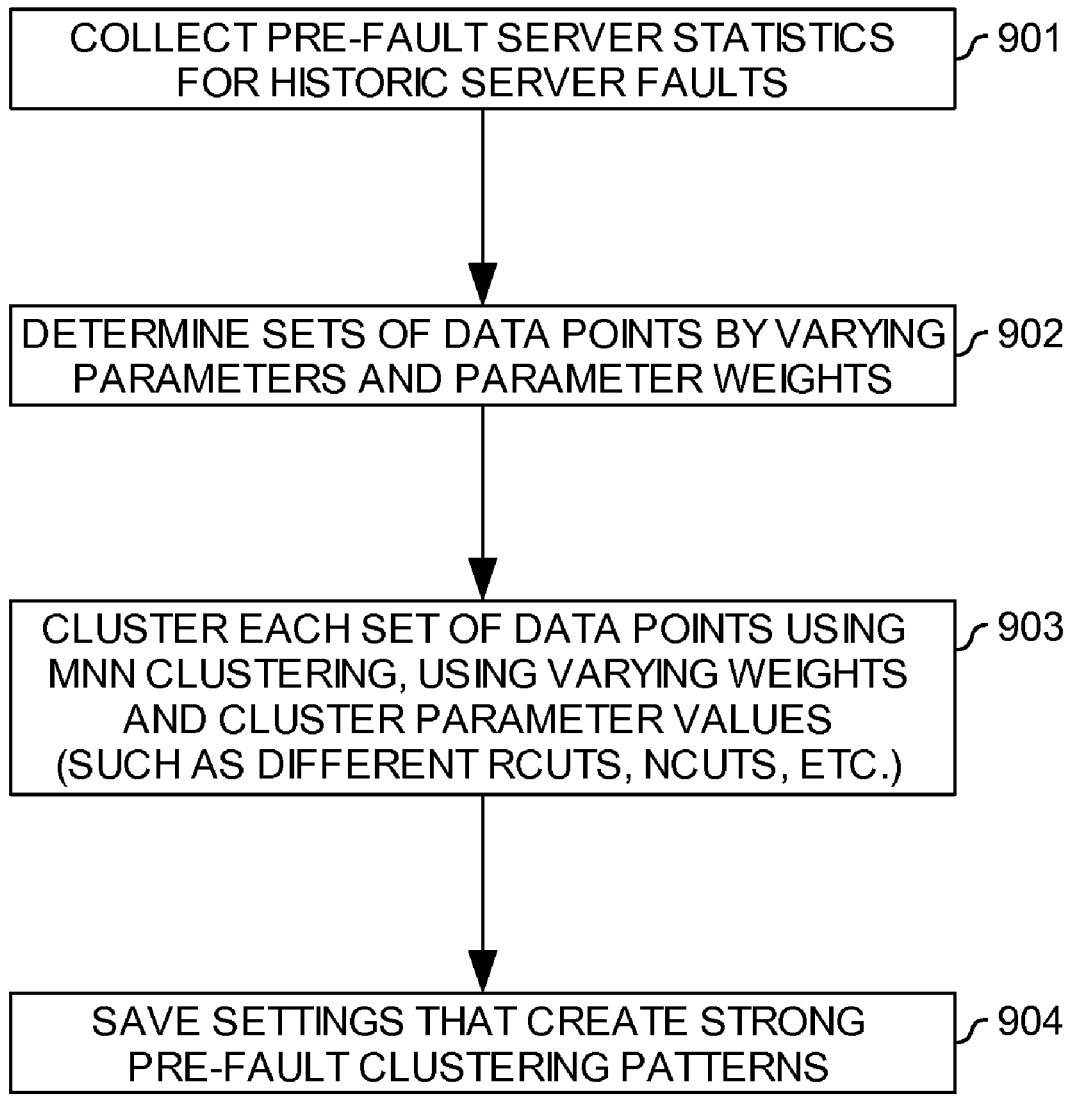
FIG. 9 is a flow diagram of exemplary operations performed to create cluster profiles according to one embodiment of the invention.

FIG. 9 is a flow diagram of exemplary operations that may be performed in calibrating a server 102 to determine pre-fault clustering patterns. The operations begin in step 901 by collecting pre-fault server statistics for historical server faults. In step 902, various settings that include a combination of server parameters and parameter weights may be determined to identify sets of multi-dimensional data points, as described above. The data points in each set may be clustered, for example, using the agglomerative Mutual Nearest Neighbor Clustering algorithm discussed above, in step 903. The settings that create strong pre-fault clustering patterns may be identified using an algorithm or Fourier analysis and saved in step 904.

Figure 10:
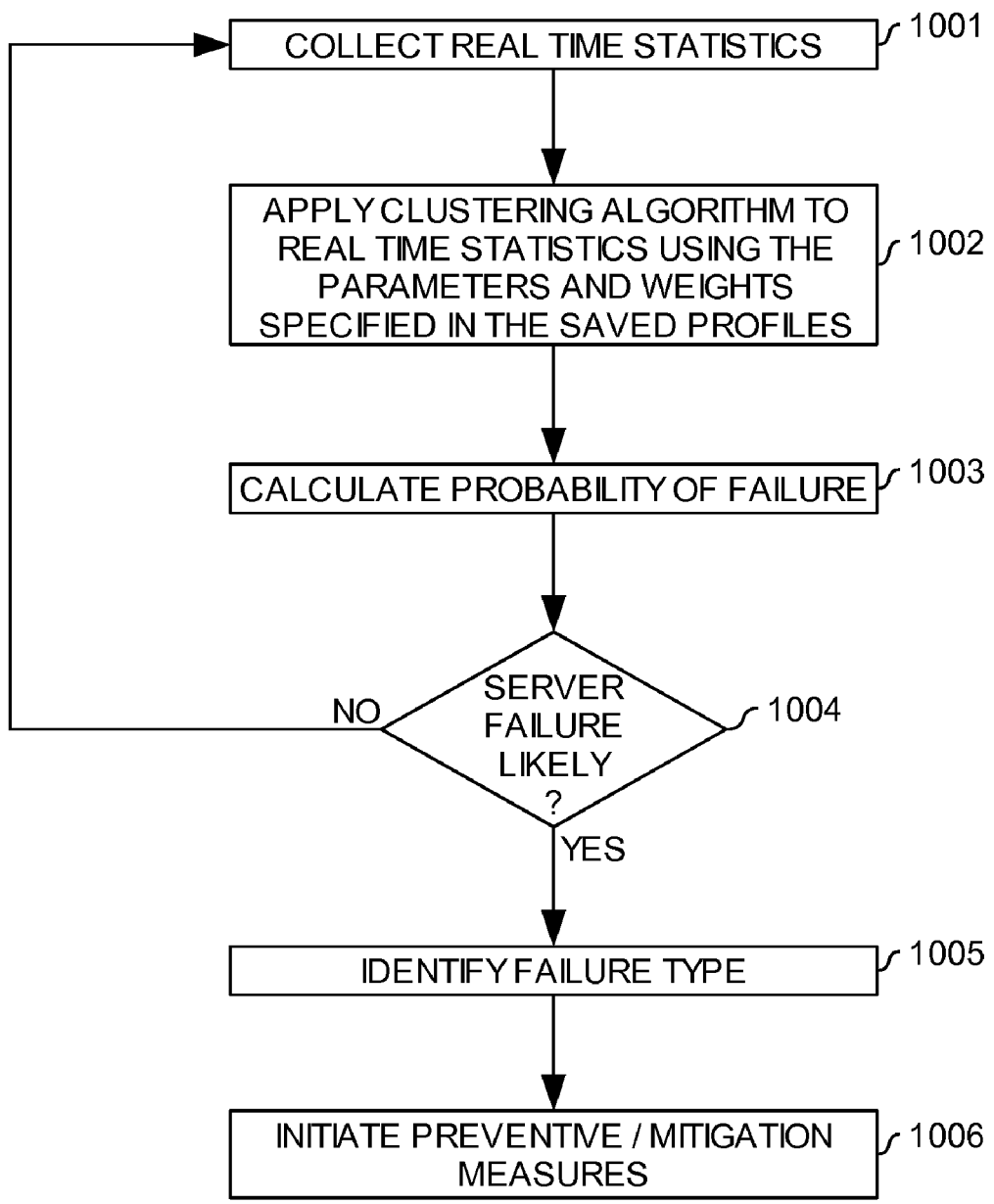
FIG. 10 is a flow diagram of exemplary operations performed to predict server failure according to one embodiment of the invention.

FIG. 10 is a flow diagram of exemplary operations that may be performed to prevent server failure. The operations begin in step 1001 by collecting real time server statistics. In step 1002, the server statistics may be clustered using the specific weights and cluster parameters from the saved profiles. A probability of server failure may be calculated in step 1003 based on the strength and persistence of clusters across various profiles. If server failure is determined to be likely in step 1004, the particular profile contributing to the probability of server failure may be identified in step 1005. In step 1006, mitigation measures may be instituted based on the profile indicating a probability of server failure.

CONCLUSION

By comparing real time clustering patterns of current server parameters to historic pre-fault clustering patterns, embodiments of the present invention facilitate prediction of server failures and proactive measures to prevent or mitigate the effects of server failure.

While the foregoing is directed to embodiments of the present invention, other and further embodiments of the invention may be devised without departing from the basic scope thereof, and the scope thereof is determined by the claims that follow.

What is claimed is:

1. A computer-implemented method for predicting failure of a server, comprising:
   collecting real-time server parameters of the server;
   generating a set of clustered real-time server parameters by applying a clustering algorithm to the collected real-time server parameters;
   applying the clustered real-time server parameters to at least one cluster profile retrieved from a computer readable storage medium, wherein the cluster profile comprises:
   one or more server parameters;
   one or more clustering parameters; and
   a weight associated with each server parameter,
   wherein the server parameters, the clustering parameters, and the weight associated with each server parameter are selected on the basis of historical pre-fault clustering of the server parameters; and
   executing a monitoring application on a computer processor to determine a probability of failure of the server based on a relationship between the clustered real-time server parameters and the one or more cluster profiles.

2. The method of claim 1, wherein determining the probability of failure of the server comprises determining a probability of failure with respect to each cluster profile.

3. The method of claim 2, further comprising:
   in response to determining the probability of failure with respect to each cluster profile:
   identifying a failure type based on the probability of failure with respect to each cluster profile; and
   initiating at least one of preventive and mitigating measures based on the identified failure type.

4. A computer readable storage medium containing a program for predicting failure of a server which, when executed by a computer processor, performs an operation, comprising:
   collecting real-time server parameters of the server;
   generating a set of clustered real-time server parameters by applying a clustering algorithm to the collected real-time server parameters;
   applying the clustered real-time server parameters to at least one cluster profile retrieved from a computer storage medium, wherein the cluster profile comprises:
   one or more server parameters;
   one or more clustering parameters; and
   a weight associated with each server parameter,
   wherein the server parameters, the clustering parameters, and the weight associated with each server parameter are selected on the basis of historical pre-fault clustering of the server parameters; and
   determining a probability of failure of the server based on a relationship between the clustered real-time server parameters and the one or more cluster profiles.

5. The computer readable storage medium of claim 4, wherein the operations further comprise creating the cluster profiles, comprising:
   for each historical server failure, collecting data for server parameters for a period of time immediately preceding the historical server failure;
   determining at least one setting, wherein the setting comprises:
   the one or more server parameters;
   the one or more clustering parameters; and
   the weight associated with each of the one or more parameters;
   determining a set of points, wherein each point comprises values of the one or more server parameters;
   determining clusters of points within the set of points based on the distance between each pair of points in the set of points, the one or more clustering parameters, and the weight associated with each server parameter;
   for each setting, determining whether the setting generates a pre-fault clustering pattern, wherein the pre-fault clustering pattern comprises at least one of
   a high rate of change of clusters prior to the server failure; and
   clusters previously defined as high-risk clusters; and
   if the setting generates a pre-fault clustering pattern, saving the setting as a cluster profile.

6. The computer readable storage medium of claim 5, wherein each point in the set of points is a multi-dimensional point $\{D1, D2, \ldots Di\}$ comprising the server parameter values, wherein D is a given parameter value and i is an integer greater than or equal to one.

7. The computer readable storage medium of claim 5, wherein determining clusters of points comprises:
   for each point in the set of points:
   determining a set of neighboring points within a predefined distance, wherein the predefined distance is defined by the clustering parameters;
   determining a set of nearest neighbors within the set of neighboring points based on a predefined number defined by the clustering parameters, wherein the predefined number determines the total number of points that may be included as nearest neighbors;
   assigning a rank value to each nearest neighbor based on the proximity of the nearest neighbor to the point;
   determining a mutual nearest neighbor score for each pair of nearest neighbor points in the set of points based on the rank values; and
   clustering the points based on the mutual nearest neighbor score.

8. The computer readable storage medium of claim 5, wherein the pre-fault clustering pattern comprises:
   a steady state period, wherein the data points merge into at least one of
   a single cluster; and
   a cluster previously defined as a normal cluster; and
   an unsteady state period immediately preceding the server failure, wherein the data points merge into at least one of
   one or more new clusters; and
   the high-risk clusters.

9. The computer readable storage medium of claim 5, wherein determining whether the setting generates a pre-fault clustering pattern comprises determining a strength of the setting, wherein the strength is based on at least one of an algorithm analysis or Fourier analysis to compare a pattern of the clusters of points in the set of data points to the pre-fault clustering pattern.

10. The computer readable storage medium of claim 4, wherein determining the probability of failure of the server comprises determining a probability of failure with respect to each cluster profile.

11. The computer readable storage medium of claim 10, the operations further comprising:
   in response to determining the probability of failure with respect to each cluster profile:
      identifying a failure type based on the probability of failure with respect to each cluster profile; and
      initiating at least one of preventive and mitigating measures based on the identified failure type.

12. A server, comprising:
   a memory comprising a monitoring application and at least one cluster profile wherein the cluster profile comprises:
      one or more server parameters;
      one or more clustering parameters; and
      a weight associated with each server parameter,
      wherein the server parameters, the clustering parameters, and the weights associated with each server parameter are selected on the basis of historical pre-fault clustering of the server parameters;
   a processor communicably connected to the memory which, when executing the monitoring application is configured to:
      collect real-time server parameters of the server;
      generate a set of clustered real-time server parameters by applying a clustering algorithm to the collected real-time server parameters;
      apply the clustered real-time server parameters to the at least one cluster profile; and
      determine a probability of failure of the server based on a relationship between the clustered real-time server parameters and the one or more cluster profiles.

13. The server of claim 12, wherein the memory further comprises a clustering application which, when executed by the processor, configures the processor to:
   for each historic server failure, collect data for server parameters for a period of time immediately preceding the server failure;
   determine at least one setting, wherein the setting comprises:
      the one or more server parameters;
      the one or more clustering parameters; and
      the weights associated with each of the one or more server parameters;
   determine a set of points, wherein each point comprises values of one or more server parameters;
   determine clusters of points within the set of points based on the distance between each pair of points in the set of points, the one or more server parameters, and the weight associated with each server parameter;
   for each setting, determine whether the setting generates a pre-fault clustering pattern, wherein the pre-fault clustering pattern comprises at least one of
      a high rate of change of clusters prior to the server failure; and
      clusters previously defined as high-risk clusters; and
   if the setting generates a pre-fault clustering pattern, save the setting as a cluster profile.

14. The server of claim 13, wherein to determine clusters of points within the set of points, the processor is configured to:
   for each point in the set of points:
      determine a set of neighboring points within a predefined distance, wherein the predefined distance is defined by the clustering parameters;
      determine a set of nearest neighbors within the set of neighboring points based on a predefined number defined by the clustering parameters, wherein the predefined number determines the total number of points that may be included as nearest neighbors;
      assign a rank value to each nearest neighbor based on the proximity of the nearest neighbor to the point;
   determine a mutual nearest neighbor score for each pair of points in the set of points based on the rank values; and
   cluster the points based on the mutual nearest neighbor score.

15. The server of claim 13, wherein, to determine whether the setting generates a pre-fault clustering pattern, the processor is configured to determine a strength of the setting, wherein the strength is based on at least one of an algorithm analysis and Fourier analysis to compare the clusters of the data points to the pre-fault clustering pattern.

16. The server of claim 12, wherein the processor, when executing the monitoring program, is further configured to:
   in response to determining the probability of server failure:
      determine a failure type based on the relationship between the one or more real-time parameters and the one or more server profiles; and
      initiate preventive or mitigating measures.

17. The server of claim 12, wherein the processor is configured to determine the probability of failure of the server failure by first determining a probability of failure with respect to each cluster profile.

18. The server of claim 17, wherein the processor is further configured to:
   in response to determining the probability of failure with respect to each cluster profile:
      identify a failure type based on the probability of failure with respect to each cluster profile; and
      initiate at least one of preventive and mitigating measures based on the identified failure type.

* * * * *